United States Patent
Saka et al.

(10) Patent No.: US 8,852,805 B2
(45) Date of Patent: Oct. 7, 2014

(54) ELECTRODE ACTIVE MATERIAL COMPRISING A MIXTURE OF A LAYERED CRYSTAL STRUCTURE MATERIAL AND A SPINEL CRYSTAL STRUCTURE MATERIAL, ELECTRODE, AND NON-AQUEOUS ELECTROLYTE SECONDARY BATTERY

(75) Inventors: Maiko Saka, Tsukuba (JP); Yuichiro Imanari, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 184 days.

(21) Appl. No.: 13/515,726

(22) PCT Filed: Dec. 15, 2010

(86) PCT No.: PCT/JP2010/073070
§ 371 (c)(1),
(2), (4) Date: Jun. 13, 2012

(87) PCT Pub. No.: WO2011/074703
PCT Pub. Date: Jun. 23, 2011

(65) Prior Publication Data
US 2012/0258351 A1  Oct. 11, 2012

(30) Foreign Application Priority Data

Dec. 18, 2009  (JP) ................................. 2009-287732

(51) Int. Cl.
*H01M 4/50* (2010.01)
*H01M 4/525* (2010.01)
*H01M 2/16* (2006.01)
*H01M 4/505* (2010.01)
*H01M 4/36* (2006.01)
*C01G 53/00* (2006.01)
*C01G 45/12* (2006.01)
*B82Y 30/00* (2011.01)

(52) U.S. Cl.
CPC .............. *H01M 4/505* (2013.01); *H01M 4/364* (2013.01); *C01P 2006/12* (2013.01); *H01M 4/525* (2013.01); *C01G 53/50* (2013.01); *C01G 45/1242* (2013.01); *C01P 2004/64* (2013.01); *C01P 2002/54* (2013.01); *C01P 2002/76* (2013.01); *Y02E 60/122* (2013.01); *C01P 2004/62* (2013.01); *C01P 2002/32* (2013.01); *B82Y 30/00* (2013.01)
USPC ...... 429/221; 429/223; 429/224; 429/231.95; 429/144; 252/182.1

(58) Field of Classification Search
USPC ............ 429/221, 144, 209, 231.95, 224, 223; 252/182.1
See application file for complete search history.

(56) References Cited

U.S. PATENT DOCUMENTS

| | | |
|---|---|---|
| 2005/0191553 A1 | 9/2005 | Fujihara et al. |
| 2007/0059598 A1* | 3/2007 | Yang .............................. 429/209 |
| 2008/0038631 A1 | 2/2008 | Nakura et al. |
| 2008/0090151 A1 | 4/2008 | Hosoya et al. |
| 2009/0104531 A1 | 4/2009 | Tanino et al. |
| 2009/0289218 A1 | 11/2009 | Kajiya et al. |
| 2010/0209771 A1 | 8/2010 | Shizuka et al. |

FOREIGN PATENT DOCUMENTS

| | | |
|---|---|---|
| CN | 1661846 A | 8/2005 |
| CN | 101427403 A | 5/2009 |
| EP | 2 314 545 A1 | 4/2011 |
| JP | 2003-092108 | 3/2003 |
| JP | 2005-340057 A | 12/2005 |
| JP | 2007-220475 A | 8/2007 |
| JP | 2009-81130 A | 4/2009 |
| JP | 2009/119104 A1 | 10/2009 |
| JP | 2009-242135 A | 10/2009 |
| WO | 2006/064775 A1 | 6/2006 |
| WO | 2009/011157 A1 | 1/2009 |

OTHER PUBLICATIONS

Machine-generated English translation of JP 2005-340057 published Aug. 12, 2005 to Sanyo Electric Co., Ltd.
Office Action issued Sep. 12, 2013 in corresponding Japanese Patent Application No. 2009-287732 with English translation.
Second Office Action issued Jul. 23, 2014 in corresponding Chinese Patent Application No. 201080057220.8 with English translation.

* cited by examiner

*Primary Examiner* — Kenneth Douyette
(74) *Attorney, Agent, or Firm* — Sughrue Mion, PLLC

(57) ABSTRACT

The present invention provides an electrode active material, an electrode and a non-aqueous electrolyte secondary battery. The electrode active material contains the following powder (A) and powder (B):
(A) a powder of a lithium mixed metal oxide that is represented by the following formula (1) and has a layered rock-salt type crystal structure, the powder having a BET specific surface area of from 3 m²/g to 30 m²/g, $$Li(Ni_{1-(x+y)}Mn_xFe_y)O_2 \quad (1)$$

wherein x is within a range of more than 0 to less than 1, y is within a range of more than 0 to not more than 0.1, and x+y is within a range of more than 0 to less than 1;
(B) a powder of a lithium mixed metal oxide that has a spinel type crystal structure.
The electrode contains the electrode active material. The non-aqueous electrolyte secondary battery includes the electrode as a positive electrode.

11 Claims, No Drawings

ELECTRODE ACTIVE MATERIAL COMPRISING A MIXTURE OF A LAYERED CRYSTAL STRUCTURE MATERIAL AND A SPINEL CRYSTAL STRUCTURE MATERIAL, ELECTRODE, AND NON-AQUEOUS ELECTROLYTE SECONDARY BATTERY

CROSS REFERENCE TO RELATED APPLICATIONS

This application is a National Stage of International Application No. PCT/JP2010/073070 filed on Dec. 15, 2010, which claims priority from Japanese Patent Application No. 2009-287732, filed on Dec. 18, 2009, the contents of all of which are incorporated herein by reference in their entirety.

TECHNICAL FIELD

The present invention relates to an electrode active material, an electrode and a non-aqueous electrolyte secondary battery.

BACKGROUND ART

An electrode active material is used for an electrode in a non-aqueous secondary battery such as a lithium secondary battery. The lithium secondary battery has already been put into practical use as a small-sized power supply for use in portable telephones, notebook personal computers, etc., and has also been tried to be applied to a middle-sized to large-sized power supply for use in automobiles, power storage, etc.

As a conventional electrode active material, Patent Document 1 has disclosed an electrode active material obtained by mixing two kinds of lithium mixed metal oxide powders having a BET specific surface area of 2.0 m²/g or less, the powder having a layered rock-salt type crystal structure.

PRIOR-ART DOCUMENT

Patent Document

[Patent Document 1]: JP2003-173776A (0083-0086)

DISCLOSURE OF THE INVENTION

A non-aqueous electrolyte secondary battery, prepared using the above-mentioned electrode active material, still has some room for improvement in applications for automobiles and the like that require rate characteristics and energy density with a good balance. An object of the present invention is to provide an electrode active material capable of achieving a non-aqueous electrolyte secondary battery that can further improve rate characteristics and energy density with a good balance in comparison with a conventional technique.

The present invention provides the following means:
<1> An electrode active material comprising the following powder (A) and powder (B):
(A) a powder of a lithium mixed metal oxide that is represented by the following formula (1) and has a layered rock-salt type crystal structure, the powder having a BET specific surface area of from 3 m²/g to 30 m²/g, $$Li(Ni_{1-(x+y)}Mn_xFe_y)O_2 \quad (1)$$

wherein x is within a range of more than 0 to less than 1, y is within a range of more than 0 to not more than 0.1, and x+y is within a range of more than 0 to less than 1;

(B) a powder of a lithium mixed metal oxide that has a spinel type crystal structure.
<2> The electrode active material according to <1>, wherein the content of the powder (A) is from 10 parts by weight to 900 parts by weight relative to 100 parts by weight of the powder (B).
<3> The electrode active material according to <1> or <2>, wherein the powder (A) is composed of primary particles having a diameter of from 0.01 μm to 0.5 μm and aggregated particles that are formed by aggregation of primary particles having a diameter of from 0.01 μm to 0.5 μm and have an average diameter of from 0.05 μm to 2 μm.
<4> The electrode active material according to any one of <1> to <3>, wherein x is from 0.3 to 0.6.
<5> The electrode active material according to any one of <1> to <4>, wherein y is from 0.02 to 0.1.
<6> The electrode active material according to any one of <1> to <5>, wherein the powder (B) has a BET specific area of from 0.1 m²/g to 4 m²/g.
<7> The electrode active material according to any one of <1> to <6>, wherein the lithium mixed metal oxide in the powder (B) contains Mn.
<8> The electrode active material according to any one of <1> to <7>, wherein the lithium mixed metal oxide in the powder (B) is represented by the following formula (2):

$$Li(Mn_aM_{1-a})_2O_4 \quad (2)$$

wherein M represents one or more elements selected from the group consisting of Al, Mg and transition metal elements, and a is within a range of more than 0 to not more than 1.
<9> An electrode comprising the electrode active material according to any one of <1> to <8>.
<10> A non-aqueous electrolyte secondary battery comprising the electrode according to <9> as a positive electrode.
<11> The non-aqueous electrolyte secondary battery according to <10> further comprising a separator.
<12> The non-aqueous electrolyte secondary battery according to <11>, wherein the separator is a laminate film which has a heat-resistant porous layer and a porous film laminated to each other.

MODE FOR CARRYING OUT THE INVENTION

<Electrode Active Material>
The electrode active material contains the following powder (A) and powder (B):
(A) a powder of a lithium mixed metal oxide that is represented by the following formula (1) and has a layered rock-salt type crystal structure, the powder having a BET specific surface area of from 3 m²/g to 30 m²/g, $$Li(Ni_{1-(x+y)}Mn_xFe_y)O_2 \quad (1)$$

wherein x is within a range of more than 0 to less than 1, y is within a range of more than 0 to not more than 0.1, and x+y is within a range of more than 0 to less than 1;
(B) a powder of a lithium mixed metal oxide that has a spinel type crystal structure.

In order to further improve the effects of the present invention, in the electrode active material, the content of the powder (A) is preferably from 10 parts by weight to 900 parts by weight, more preferably from 30 parts by weight to 800 parts by weight, furthermore preferably from 50 parts by weight to 700 parts by weight, and particularly preferably from 100 parts by weight to 600 parts by weight relative to 100 parts by weight of the powder (B).

The electrode active material of the present invention can be obtained by mixing the powder (A) and powder (B). The mixing of the powder (A) and the powder (B) may be carried out by either dry mixing or wet mixing. From the viewpoint of convenience, dry mixing is preferably used. Examples of a mixing apparatus include a mortar mixer, a stirring mixer, a V-type mixer, a W-type mixer, a ribbon mixer, a drum mixer, and a ball mill.

In the case where the powder (A) has a BET specific surface area of less than 3 m²/g, the resultant non-aqueous electrolyte secondary battery has insufficient rate characteristics. In the case where the powder (A) has a BET specific surface area of more than 30 m²/g, the filling density of the electrode active material in an electrode is lowered to cause a reduction in energy density in a secondary battery. From the viewpoint of obtaining a non-aqueous electrolyte secondary battery having high energy density, the powder (A) preferably has a BET specific surface area of from 3 m²/g to 15 m²/g, and more preferably from 4 m²/g to 10 m²/g.

The powder (A) is preferably composed of primary particles having a diameter of from 0.01 μm to 0.5 μm and aggregated particles that are formed by aggregation of primary particles having a diameter of from 0.01 μm to 0.5 μm and have an average diameter of from 0.05 μm to 2 μm. The powder (A) is more preferably composed of primary particles having a diameter of from 0.02 μm to 0.4 μm and aggregated particles that are formed by aggregation of primary particles having a diameter of from 0.02 μm to 0.4 μm and have an average diameter of from 0.1 μm to 1.5 μm. The powder (A) is furthermore preferably composed of primary particles having a diameter of from 0.05 μm to 0.35 μm and aggregated particles that are formed by aggregation of primary particles having a diameter of from 0.05 μm to 0.35 μm and have an average diameter of from 0.2 μm to 1 μm. Accordingly, the rate characteristics and energy density of a non-aqueous electrolyte secondary battery are further improved.

In this case, the diameter of the primary particles and the average diameter of the aggregated particles can be determined by scanning electron microscopic photographs (SEM photographs). Arbitrary 50 aggregated particles are extracted from the aggregated particles photographed in the SEM photographs, and the respective particle sizes are measured, and the average value of these values is used as the average diameter of the aggregated particles that are formed by aggregation of the primary particles.

The lithium mixed metal oxide in the powder (A) has a layered rock-salt type crystal structure, and is represented by the following formula (1). The powder (A) contains Fe. According to the present invention, without using expensive Co that is often generally used as a metal element for a positive electrode active material, a non-aqueous electrolyte secondary battery that is superior in rate characteristics and energy density can be provided.

$$Li(Ni_{1-(x+y)}Mn_xFe_y)O_2 \qquad (1)$$

wherein x is within a range of more than 0 to less than 1, y is within a range of more than 0 to not more than 0.1, and x+y is within a range of more than 0 to less than 1.

Since the resultant non-aqueous electrolyte secondary battery tends to have a high average discharging potential, in the formula (1), x is preferably from 0.1 to 0.7, more preferably from 0.3 to 0.6, and furthermore preferably from 0.3 to 0.5. Moreover, y is preferably from 0.02 to 0.07.

The lithium mixed metal oxide represented by the formula (1) normally has a crystal structure whose space group is classified into R-3m, and these crystal structures can be identified by powder X-ray diffraction measurements using CuKα as a radiation source.

The electrode active material of the present invention contains the powder (B) together with the powder (A). The powder (B) is a powder of a lithium mixed metal oxide that has a spinel type crystal structure.

The powder (B) preferably has a BET specific surface area of from 0.1 m²/g to 4 m²/g. Accordingly, a mixing state of the powder (B) with the powder (A) is favorable so that the effects of the present invention can be further enhanced.

The lithium mixed metal oxide in the powder (B) preferably contains Mn. Accordingly, it becomes possible to provide a non-aqueous electrolyte secondary battery that has high rate characteristics and high energy density.

The lithium mixed metal oxide in the powder (B) is more preferably represented by the following formula (2):

$$Li(Mn_aM_{1-a})_2O_4 \qquad (2)$$

wherein M represents one or more elements selected from the group consisting of Al, Mg and transition metal elements, and a is within a range of more than 0 to not more than 1.

Since the resultant non-aqueous electrolyte secondary battery tends to have a high average discharging potential, a is preferably from 0.05 to 0.95, and more preferably from 0.3 to 0.9. Preferably, M is one or more elements selected from the group consisting of Al, Ni, Fe, Ga, Cr, Co, Mg and Ti, and more preferably one or more elements selected from the group consisting of Al, Ni and Fe.

Within a range not impairing the effects of the present invention, in the lithium mixed metal oxide of the power (A), the powder (B) or both, one portion of metal elements other than Li may be substituted with other elements. Examples of the other elements include one or more elements selected from the group consisting of B, Al, Ti, V, Ga, In, Si, Ge, Sn, Mg, Sc, Y, Zr, Hf, Nb, Ta, Cr, Mo, W, Tc, Ru, Rh, Ir, Pd, Cu, Ag and Zn. Preferable examples of the other elements include one or more elements selected from the group consisting of Ti, V, Mg, Sc, Y, Zr, Cr, Mo, W, Cu, Ag and Zn.

Within a range not impairing the effects of the present invention, a compound different from the powder (A) and the powder (B) may be attached to the surface of each of particles constituting the powder (A), powder (B) or both. Examples of the compound include compounds containing one or more elements selected from the group consisting of B, Al, Ga, In, Si, Ge, Sn, Mg, and transition metal elements, preferably compounds containing one or more elements selected from the group consisting of B, Al, Mg, Ga, In, Si and Sn, and more preferably compounds of Al. Specific examples of the compound include an oxide, hydroxide, oxyhydroxide, carbonate, nitrate and organic acid salt of the above-mentioned elements, and preferably, an oxide, hydroxide and oxyhydroxide thereof. These compounds may be used in a mixed manner. Among these compounds, alumina is the most preferable compound. After the attachment, heating may be carried out.

<Method of Producing Powder (A) and Powder (B)>

The following description will discuss a method of producing a powder of a lithium mixed metal oxide.

The powder of a lithium mixed metal oxide is produced by calcining a raw material including constituent metal elements at prescribed ratios. Although depending on the kinds of the constituent metal elements, the BET specific surface area of the powder of a lithium mixed metal oxide can be controlled by a calcining temperature. The raw material may be a mixture of compounds of the respective constituent metal elements. This compound may be a mixed compound including a plurality of metal elements. Examples of the compound of metal elements include an oxide of metal elements, or those compounds that can be formed into an oxide of metal elements by decomposition and/or oxidization at high temperature, such as a hydroxide, oxyhydroxide, carbonate, nitrate, acetate, halide, oxalate, and alkoxide of metal elements.

The BET specific surface area, the diameter of primary particles and the average particle diameter of aggregated particles can be controlled by allowing the raw material prior to calcination to contain a reaction accelerator. Examples of the reaction accelerator include chlorides such as NaCl, KCl and $NH_4Cl$, fluorides such as LiF, NaF, KF and $HN_4F$, boron oxide, and boric acid. The reaction accelerator is preferably chlorides, and more preferably KCl. Normally, in the case of the same calcining temperature, as the content of the reaction accelerator in the raw material becomes higher, the BET specific surface area tends to become smaller, while the diameter of primary particles and the average diameter of aggregated particles tend to become larger. Two or more kinds of the reaction accelerators may be used in combination. The reaction accelerator may be left in the powder of a lithium mixed metal oxide, or may be removed therefrom by washing after calcination, evaporation during calcination, or the like.

The calcining temperature upon producing the powder (A) is preferably from 600° C. to 1100° C., and more preferably from 650° C. to 900° C. The period of time during which the temperature is retained at the temperature is normally from 0.1 to 20 hours, and preferably from 0.5 to 8 hours. The temperature rising rate up to the calcining temperature is normally from 50° C. to 400° C./hour, and the temperature lowering rate from the calcining temperature to room temperature is normally from 10° C. to 400° C./hour. As the calcining atmosphere, atmospheric air, oxygen, nitrogen, argon or a mixed gas thereof may be used, and preferably the atmospheric air is used.

The calcining temperature upon producing the powder (B) is preferably from 600° C. to 1100° C., and more preferably from 750° C. to 900° C. The period of time during which the calcining temperature is retained at the temperature is normally from 0.1 to 20 hours, and preferably from 5 to 15 hours. The temperature rising rate up to the calcining temperature is normally from 50° C. to 400° C./hour, and the temperature lowering rate from the calcining temperature to room temperature is normally from 10° C. to 40092/hour. As the calcining atmosphere, atmospheric air, oxygen, nitrogen, argon or a mixed gas thereof may be used, and preferably an oxygen atmosphere is used. By using the oxygen atmosphere, the reaction of the raw material progresses easily, and as a result, an impurity phase other than the spinel type crystal structure in the powder (B) is made smaller.

The powder of a lithium mixed metal oxide after the calcination may be pulverized using a ball mill, a jet mill, or the like. By using such a pulverizing process, the BET specific surface area of the powder can be controlled. The pulverization and the calcination may be repeated two or more times. The powder may be washed or classified, if necessary. Within a range not impairing the effects of the present invention, one or more kinds of powders of other lithium mixed metal oxides may be mixed.

In the case of producing the powder of a lithium mixed metal oxide represented by the formula (1) in the powder (A), for example, a mixture including a compound of lithium, a compound of nickel, a compound of manganese and a compound of iron so as to have a molar ratio of Li:Ni:Mn:Fe of 1:(1:1-(x+y)):x:y is calcined to produce the powder of a lithium mixed metal oxide. Examples of the compound of lithium include lithium hydroxide monohydrates, examples of the compound of nickel include nickel hydroxides, examples of the compound of manganese include manganese dioxides, and examples of the compound of iron include diiron trioxides. The calcining temperature is, for example, from 600° C. to 1000° C.

In the case of producing the powder of a lithium mixed metal oxide represented by the formula (2) in the powder (B), for example, a mixture including a compound of lithium, a compound of manganese, and a compound of M (or a mixture of compounds of M) so as to have a molar ratio of Li:Mn:M of 1:2a:(2-2a) is calcined to produce the powder of a lithium mixed metal oxide. Examples of the compound of lithium include lithium hydroxide monohydrates, examples of the compound of manganese include manganese dioxides, and examples of the compound of M include, in the case where M is Ni, nickel hydroxides. The calcining temperature is, for example, from 700° C. to 1000° C.

The mixing of the respective compounds prior to calcination may be carried out by either dry mixing or wet mixing. From the viewpoint of convenience, dry mixing is preferably used. Examples of a mixing apparatus include a mortar mixer, a stirring mixer, a V-type mixer, a W-type mixer, a ribbon mixer, a drum mixer, and a ball mill.

Examples of the mixed compound include coprecipitation products obtained by the following coprecipitation reaction:
(a) a step of obtaining a coprecipitation slurry by bringing an aqueous solution containing a plurality of metal elements into contact with an alkali;
(b) a step of obtaining a coprecipitation product from the coprecipitation slurry.

In the case where the powder of a lithium mixed metal oxide represented by the formula (1) is obtained, the aqueous solution containing a plurality of metal elements may be sufficient to include Ni, Mn and Fe in prescribed molar ratios, and the aqueous solution may be produced by dissolving water-soluble compounds of these elements in water. Examples of the water-soluble compound of nickel include nickel chlorides, examples of the water-soluble compound of manganese include manganese chlorides, and examples of the water-soluble compound of iron include iron chlorides. These water-soluble compounds may be hydrates. These water-soluble compounds may be dissolved in water.

In the case where the powder of a lithium mixed metal oxide represented by the formula (2) is obtained, the aqueous solution containing a plurality of metal elements may be sufficient to include Mn and M in prescribed molar ratios, and the aqueous solution may be produced by dissolving water-soluble compounds of these elements in water. Examples of the water-soluble compound of manganese include manganese chlorides, and examples of the water-soluble compound of M include, in the case where M is Ni, nickel hydroxides. These water-soluble compounds may be hydrates. These water-soluble compounds can be dissolved in water.

In the case where a compound that are hardly dissolved in water, such as hydroxide, acid hydroxide, and oxide, is used, these compounds may be dissolved in an acid such as hydrochloric acid so as to produce aqueous solutions thereof. Among the water-soluble compounds, compounds that are hardly dissolved in water and metal materials, two or more kinds thereof may be used in combination.

Examples of the alkali include one or more compounds selected from the group consisting of LiOH (lithium hydroxide), NaOH (sodium hydroxide), KOH (potassium hydroxide), $NH_3$ (ammonia), $Na_2CO_3$ (sodium carbonate), $K_2CO_3$ (potassium carbonate) and $(NH_4)_2CO_3$ (ammonia carbonate), and these may be hydrates. Normally, these alkalis are dissolved in water and used as aqueous solutions. The alkali concentration in the aqueous solution is normally from about 0.1 to 20 M (mole/liter), and preferably from about 0.5 to 10

M (mole/liter). From the viewpoint of reducing impurities in the electrode active material, the alkali is preferably LiOH, a hydrate thereof, or both. From the viewpoint of production costs, the alkali is preferably KOH, a hydrate thereof, or both. Two or more alkalis may be used in combination.

The method of generating a coprecipitation product by bringing an aqueous solution containing a plurality of metal elements into contact with an alkali is preferably a method of generating a coprecipitation product by mixing an aqueous solution containing a plurality of metal elements with an aqueous alkali solution. More preferably, a mixed solution containing the coprecipitation product is stirred. Accordingly, a coprecipitation product having a uniform particle size is obtained. The amounts of the aqueous solution containing a plurality of metal elements and alkali aqueous solution to be charged are adjusted while measuring the pH of the mixture containing a coprecipitation product. From the viewpoint of obtaining a coprecipitation product having a more uniform particle size, the pH of the mixed solution is preferably from 11 to 13.

In the step (b), a coprecipitation product is obtained from the coprecipitation slurry. The step (b) may be carried out using any method as long as a coprecipitation product can be obtained; however, from the viewpoint of operability, a solid-liquid separation method such as filtration is preferably used. The coprecipitation product can also be obtained by a method of heating the coprecipitation slurry to evaporate the liquid, such as spray drying.

In the case of obtaining the coprecipitation product by solid-liquid separation, it is preferable that after the solid-liquid separation of the coprecipitation slurry, the resultant solid component is washed and dried. In the case where alkalis, Cl and the like are excessively present in the coprecipitation product obtained after the solid-liquid separation, these can be removed by carrying out washing. From the viewpoint of efficiently washing the coprecipitation product, water is preferably used as a washing solution. A water-soluble organic solvent, such as alcohol or acetone, may be added to the washing solution, if necessary. The washing may be carried out two or more times, and for example, after the water washing is carried out, washing may be again carried using the above-mentioned water-soluble organic solvent.

The drying is normally carried out by a thermal treatment. Blow drying, vacuum drying, or the like may be carried out. In the case where the coprecipitation product is dried by a heating treatment, the temperature is normally from 50 to 300° C., and preferably from about 100 to 200° C.

By using the coprecipitation product obtained as described above as a mixed compound, a mixture obtained by mixing the mixed compound with a compound of lithium is calcined in the same manner as described above to obtain a powder of a lithium mixed metal compound. Examples of the compound of lithium include one or more compounds selected from the group consisting of lithium hydroxide, lithium chloride, lithium nitrate and lithium carbonate, and these compounds may be hydrates thereof. The mixing may be carried out by either dry mixing or wet mixing. From the viewpoint of convenience, dry mixing is preferably used. Examples of a mixing apparatus include a mortar mixer, a stirring mixer, a V-type mixer, a W-type mixer, a ribbon mixer, a drum mixer, and a ball mill.

<Electrode: Positive Electrode>

The electrode of the present invention contains the electrode active material of the present invention. The electrode of the present invention is usable as an electrode in a non-aqueous electrolyte secondary battery, and in particular, the electrode of the present invention is preferably used as a positive electrode in a non-aqueous electrolyte secondary battery.

The electrode of the present invention can be produced by supporting an electrode mixture including the electrode active material of the present invention, a binder and, if necessary, a conductive agent onto an electrode collector.

AS the conductive agent material, a carbonaceous material can be used, and examples of the carbonaceous material include graphite powder, carbon black, acetylene black, and a fiber-state carbonaceous material. Carbon black and acetylene black are in the form of fine particles with a large surface area. When a small amount of these materials is added to the electrode mixture, the conductivity inside the electrode becomes higher so that the charging/discharging efficiency and rate characteristic of a secondary battery are improved. However, in the case where too much of carbon black is added to the electrode mixture, the bonding property of the binder, which is exerted between the electrode mixture and the electrode collector, is lowered, resulting in an increase in resistance inside the electrode. The ratio of the conductive material in the electrode mixture is normally from 5 parts by weight to 20 parts by weight relative to 100 parts by weight of the electrode active material. When the conductive material is a fiber-state carbonaceous material such as a graphitized carbon fiber or a carbon nanotube, this ratio can be lowered.

Examples of the binder include thermoplastic resins, and specific examples of the thermoplastic resin include fluorine resins such as polyvinylidene fluoride (hereinafter, may be sometimes referred to as PVDF), polytetrafluoroethylene (hereinafter, may be sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene. Two or more kinds of these may be mixed with one another and used. A fluorine resin and a polyolefin resin may be used as the binder, and by allowing the electrode mixture to contain these resins so as to have a ratio of the fluorine resin from 1 to 10% by weight as well as a ratio of the polyolefin resin from 0.1 to 2% by weight relative to the positive electrode mixture, an electrode mixture having a superior bonding property with the electrode collector can be obtained.

In the case where the electrode of the present invention is used as a positive electrode in a secondary battery, examples of the electrode collector include Al, Ni, and stainless steel, and Al is preferably used from the viewpoints of being easily processed into a thin film and of low costs.

Examples of a method of supporting the electrode mixture on the electrode collector include a pressure molding method and a method in which an electrode mixture paste is obtained further using an organic solvent or the like, and then the electrode collector is coated with the paste, followed by drying, and the resultant sheet is pressed so that the electrode mixture is anchored to the collector. The paste contains the electrode active material, the conductive material, the binder and an organic solvent. Examples of the organic solvent include amine-based solvents such as N,N-dimethylaminopropylamine and diethylenetriamine; ether-based solvents such as ethylene oxide and tetrahydrofuran; ketone-based solvents such as methylethyl ketone; ester-based solvents such as methyl acetate; and amide-based solvents such as dimethyl acetoamide and N-methyl-2-pyrrolidone (hereinafter, may be sometimes referred to as NMP). Examples of a method of coating the electrode collector with the electrode mixture paste include a slit-die coating method, a screen coating method, a curtain coating method, a knife coating method, a gravure coating method, and an electrostatic spraying method.

<Non-Aqueous Electrolyte Secondary Battery>

The following description will discuss a non-aqueous electrolyte secondary battery having the above-mentioned electrode as a positive electrode.

The non-aqueous electrolyte secondary battery of the present invention has the electrode of the present invention as its positive electrode. The non-aqueous electrolyte secondary battery can be produced through processes in which an electrode group obtained by stacking or stacking and winding a separator, a positive electrode, a separator and a negative electrode in this order, is housed in a battery case such as a battery can, and an electrolytic solution comprising an organic solvent and containing an electrolyte is injected into the case.

Examples of the shape of the electrode group include shapes having a cross section such as a circular shape, an elliptical shape, a rectangular shape or a rectangular shape with round corners, when the electrode group was cut in the direction perpendicular to the axis of winding of the electrode group. Examples of the shape of the battery include a paper shape, a coin shape, a cylinder shape, and a rectangular shape.

<Negative Electrode for Non-Aqueous Electrolyte Secondary Battery>

The negative electrode can be doped and dedoped with the lithium ions at a potential lower than that of the positive electrode. Examples of the negative electrode include an electrode formed by supporting a negative electrode mixture containing a negative electrode material on a negative electrode collector, or an electrode comprised of solely a negative electrode material. Examples of the negative electrode material include materials capable of being doped and dedoped with the lithium ions at a potential lower than that of the positive electrode, among materials selected from a carbonaceous material, a chalcogen compound (such as an oxide or a sulfide), a nitride, metal and an alloy. These negative electrode materials may be mixed and used.

The negative electrode material is exemplified in the following materials. Specific examples of the carbonaceous material include graphites such as natural graphite and artificial graphite, cokes, carbon black, thermally decomposable carbons, carbon fibers, and calcined polymeric materials. Specific examples of the oxide include oxides of silicon represented by the formula $SiO_x$ (wherein x is a positive real number) such as $SiO_2$ and SiO; oxides of titanium represented by the formula $TiO_x$ (wherein x is a positive real number) such as $TiO_2$ and TiO; oxides of vanadium represented by the formula $VO_x$ (wherein x is a positive real number) such as $V_2O_5$ and $VO_2$; oxides of iron represented by the formula $FeO_x$ (wherein x is a positive real number) such as $Fe_3O_4$, $Fe_2O_3$ and FeO; oxides of tin represented by the formula $SnO_x$ (wherein x is a positive real number) such as $SnO_2$ and SnO; oxides of tungsten represented by the general formula $WO_x$ (wherein x is a positive real number) such as $WO_3$ and $WO_2$; and mixed metal oxides containing lithium and titanium and/or vanadium such as $Li_4Ti_5O_{12}$ and $LiVO_2$ (including $Li_{1.1}V_{0.9}O_2$). Specific examples of the sulfide include sulfides of titanium represented by the formula $TiS_x$ (wherein x is a positive real number) such as $Ti_2S_3$, $TiS_2$ and TiS; sulfides of vanadium represented by the formula $VS_x$ (wherein x is a positive real number) such as $V_3S_4$, $VS_2$ and VS; sulfides of iron represented by the formula $FeS_x$ (wherein x is a positive real number) such as $Fe_3S_4$, $FeS_2$ and FeS; sulfides of molybdenum represented by the formula $MoS_x$ (wherein x is a positive real number) such as $Mo_2S_3$ and $MoS_2$; sulfides of tin represented by the formula $SnS_x$ (wherein x is a positive real number) such as $SnS_2$ and SnS; sulfides of tungsten represented by the formula $WS_x$ (wherein x is a positive real number) such as $WS_2$; sulfides of antimony represented by the formula $SbS_x$ (wherein x is a positive real number) such as $Sb_2S_3$; and sulfides of selenium represented by the formula $SeS_x$ (wherein x is a positive real number) such as $Se_5S_3$, $SeS_2$ and SeS. Specific examples of the nitride include lithium-containing nitrides such as $Li_3N$ and $Li_{3-x}A_xN$ (wherein A represents Ni and/or Co, and 0<x<3 is satisfied). Two or more kinds of these carbonaceous materials, oxides, sulfides and nitrides may be used in combination. These materials may be crystalline or amorphous. Each of these carbonaceous materials, oxides, sulfides and nitrides is mainly supported on a negative electrode collector, and used as an electrode.

Specific examples of the metal include lithium metal, silicon metal and tin metal. Specific examples of the alloy include lithium alloys such as Li—Al, Li—Ni and Li—Si; silicon alloys such as Si—Zn; tin alloys such as Sn—Mn, Sn—Co, Sn—Ni, Sn—Cu and Sn—La; and alloys such as $Cu_2Sb$ and $La_3Ni_2Sn_7$. Each of these metals and alloys is mainly used alone as an electrode (for example, as a foil).

From the viewpoints of high potential flatness, low average discharging potential and good cycling characteristics of the resultant secondary battery, the negative electrode material is preferably a carbonaceous material mainly composed of graphite such as natural graphite or artificial graphite. Examples of the shape of the carbonaceous material include a flaky shape such as natural graphite, a spherical shape such as meso-carbon microbeads, a fiber shape such as graphitized carbon fibers, and an aggregate of fine powders.

The negative electrode mixture may contain a binder, if necessary. Examples of the binder include thermoplastic resins. Specific examples of the thermoplastic resin include PVDF, thermoplastic polyimide, carboxymethyl cellulose, polyethylene, and polypropylene.

Examples of the negative electrode collector include Cu, Ni, and stainless steel, and from the viewpoints of hardly forming an alloy with lithium and of being easily processed into a thin film, Cu is preferably used. Examples of a method of supporting the negative electrode mixture onto the negative electrode collector include the same methods as those of the positive electrode, that is, a pressure molding method and a method in which a negative electrode mixture paste is obtained further using a solvent or the like, and then the negative electrode collector is coated with the paste, followed by drying, and the resultant sheet is pressed so that the negative electrode mixture is anchored to the collector.

<Separator for Non-Aqueous Electrolyte Secondary Battery>

Examples of the separator include members having various material modes such as a porous film, a nonwoven cloth, and a woven cloth, which are made from materials such as polyolefin resins including polyethylene and polypropylene, fluorine resins, and nitrogen-containing aromatic copolymers. The separator may be made from two or more kinds of the above-mentioned materials, or may be a laminated separator which has the above-mentioned members laminated to each other. Examples of the separator include those separators disclosed in, for example, JP2000-30686A and JP10-324758A. From the viewpoint of increasing the volume energy of the battery with a reduction in inner resistance, the thickness of the separator is normally from about 5 to 200 μm, and preferably from about 5 to 40 μm. The separator is preferably made as thin as possible, as long as its mechanical strength can be retained. From the viewpoint of the ion permeability of a secondary battery, the separator is preferably provided with a gas permeability measured by a Gurley method of 50 to 300 seconds/100 ccs, and more preferably 50 to 200 seconds/100 ccs. The rate of porosity of the separator is normally 30 to 80% by volume, and more preferably 40 to 70% by volume. The separator may be formed by stacking separators having different porosities.

The separator preferably includes a porous film containing a thermoplastic resin. In a non-aqueous electrolyte secondary battery, the separator is disposed between the positive electrode and the negative electrode. The separator preferably has such a function that, when an abnormal current flows in a battery due to a short circuit or the like between positive and negative electrodes, it interrupts the current to prevent an excessive current from flowing therethrough (shutdown). In this case, the shutdown is carried out by clogging the fine pores of the porous film in the separator when the normally used temperature is exceeded. Even when, after the clogging of the fine pores in the separator, the temperature inside the battery rises to a certain degree of high temperature, the state where the clogging of the fine pores in the separator is preferably retained without the separator being ruptured by the temperature. Examples of such a separator include laminate films which have a heat-resistant porous layer and a porous film laminated to each other. By using the film as the separator, the heat-resistant property of the secondary battery is further improved. The heat-resistant porous layers may be stacked on the two surfaces of the porous film.

<Separator for Non-Aqueous Electrolyte Secondary Battery: Laminate Film>

The following description will discuss the laminate film which has the heat-resistant porous layer and the porous film laminated to each other.

In the laminate film, the heat-resistant porous layer is a layer having a heat-resistant property higher than that of the porous film, and the heat-resistant porous layer may be formed from an inorganic powder, or may contain a heat-resistant resin. By allowing the heat-resistant porous layer to contain a heat-resistant resin, it is possible to form a heat-resistant porous layer using an easy procedure such as coating. Examples of the heat-resistant resin include polyamide, polyimide, polyamideimide, polycarbonate, polyacetal, polysulfone, polyphenylene sulfide, polyetherketone, aromatic polyester, polyether sulfone and polyether imide. The heat-resistant resin is preferably polyamide, polyimide, polyamideimide, polyether sulfone or polyether imide, more preferably, polyamide, polyimide or polyamideimide, furthermore preferably, a nitrogen-containing aromatic polymer such as an aromatic polyamide (para-oriented aromatic polyamide, meta-oriented aromatic polyamide), an aromatic polyimide, or an aromatic polyamideimide, and especially preferably an aromatic polyamide. From the viewpoint of use with easiness, the heat-resistant resin is particularly preferably a para-oriented aromatic polyamide (hereinafter, may be sometimes referred to as para-aramide). Moreover, examples of the heat-resistant resin include poly-4-methylpentene-1 and cyclic olefin-based polymers. By using these heat-resistant resins, the heat-resistant property of the laminate film, that is, the thermal film-rupturing temperature of the laminate film can be further improved. In the case where, among these heat-resistant resins, the nitrogen-containing aromatic polymer is used, good compatibility with an electrolytic solution may be sometimes exerted because of the polarity inside its molecule, and in such a case, the liquid-retaining property of the electrolytic solution in the heat-resistant porous layer is improved. Thus, upon production of a non-aqueous electrolyte secondary battery, the injecting rate of the electrolytic solution becomes faster, and the charge/discharge capacity of the non-aqueous electrolyte secondary battery is also increased.

The thermal film-rupturing temperature of the laminate film depends on the kind of the heat-resistant resin, and is selected and used in accordance with the application state and application purpose. More specifically, in the case where the nitrogen-containing aromatic polymer is used as the heat-resistant resin, the thermal film-rupturing temperature can be controlled to about 400° C., in the case where poly-4-methylpentene-1 is used, it can be controlled to about 250° C., and in the case where a cyclic olefin-based polymer is used, it can be controlled to about 300° C., respectively. In the case where the heat-resistant porous layer is made from an inorganic powder, the thermal film-rupturing temperature can be controlled to, for example, 500° C. or more.

The para-amide can be obtained by condensation polymerization between a para-oriented aromatic diamine and a para-oriented aromatic dicarboxylic acid halide, and its amide bonds are virtually composed of repeating units bonded at the para position or corresponding oriented position of an aromatic ring (for example, an oriented position extending coaxially in the opposite direction or in parallel therewith, such as 4,4'-biphenylene, 1,5-naphthalene, and 2,6-naphthalene). Specific examples thereof include para-aramides having a para-oriented structure or a structure corresponding to the para-oriented type such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6 naphthalene dicarboxylic acid amide), poly(2-chloro-paraphenylene terephthalamide), and paraphenylene terephthalamide/2,6-dichloroparaphenylene terephthalamide copolymers.

The aromatic polyimide is preferably a total aromatic polyimide produced by condensation polymerization between an aromatic dianhydride and a diamine. Specific examples of the dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Specific examples of the diamine include oxydianiline, paraphenylene diamine, benzophenone diamine, 3,3'-methylene dianiline, 3,3'-diaminobenzophenone, 3,3'-diaminodiphenyl sulfone and 1,5-naphthalene diamine. Moreover, a polyimide that is soluble to a solvent is desirably used. Examples of the polyimide include a polyimide of a polycondensation product between 3,3',4,4'-diphenylsulfonetetracarboxylic dianhydride and an aromatic diamine.

Examples of the aromatic polyamideimide include a condensation polymerization product between an aromatic dicarboxylic acid and an aromatic diisocyanate, and a condensation polymerization product between an aromatic dianhydride and an aromatic diisocyanate. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate, and m-xylene diisocyanate.

From the viewpoint of improving the ion permeability, the thickness of the heat-resistant porous layer is preferably made thinner, and specifically, it is preferably from 1 μm to 10 μm, more preferably from 1 μm to 5 μm, and particularly preferably from 1 μm to 4 μm. The heat-resistant porous layer has fine pores, and the size (diameter) of each pore is normally 3 μm or less, and preferably 1 μm or less.

In the case where the heat-resistant porous layer contains a heat-resistant resin, it may further contain a filler. The material for the filler may be an organic powder, an inorganic powder or a mixture thereof. Particles forming the filler preferably have an average particle size of from 0.01 μm to 1 μm.

Examples of the organic powder include powders made from organic substances such as a single material or a copolymer of two or more kinds of materials including styrene, vinyl ketone, acrylonitrile, methylmethacrylate, ethylmethacrylate, glycidyl methacrylate, glycidyl acrylate and methylacrylate; fluorine resins such as polytetrafluoroethylene, a tetrafluoroethylene-hexafluoropropylene copolymer, a tetrafluoroethylene-ethylene copolymer, and polyvinylidene fluoride; melamine resins; urea resins; polyolefins; and polymethacrylates. Each of these organic powders may be used solely, or two or more kinds thereof may be mixed and used. Among these organic powders, from the viewpoint of chemical stability, a polytetrafluoroethylene powder is preferably used.

Examples of the inorganic powder include powders made from inorganic substances such as metal oxides, metal nitrides, metal carbides, metal hydroxides, carbonates, and sulfates. Among these, powders made from inorganic substances having low conductivity are preferably used. Specific examples of the preferable inorganic powder include powders made from one or more compounds selected from the group consisting of alumina, silica, titanium dioxide and calcium carbonate. Each of these inorganic powders may be used solely, or two or more kinds thereof may be mixed and used. Among these inorganic powders, from the viewpoint of chemical stability, an alumina powder is preferably used. More preferably, all the particles forming the alumina powder are composed of alumina particles, and furthermore preferably, all the particles forming the filler are alumina particles, with a portion or all of the alumina particles being formed into virtually spherical shapes. In the case where the heat-resistant porous layer is made from inorganic powder, the above-mentioned inorganic powder may be used, and may also be mixed with a binder, if necessary, and used.

In the case where the heat-resistant porous layer contains a heat-resistant resin, the content of the filler is dependent on the specific gravity of the filler material. For example, when all the particles forming the filler are made of alumina particles, the content of the filler is normally from 5 to 95, preferably from 20 to 95, and more preferably from 30 to 90 relative to total weight 100 of the heat-resistant porous layer. These ranges can be appropriately determined depending on the specific gravity of the filler material.

Examples of the filler shape include a virtually spherical shape, a plate shape, a pillar shape, a needle shape, a whisker shape, and a fiber shape, and from the viewpoint of easily forming uniform pores, a virtually spherical shape is preferable. Examples of the virtually spherical particles include particles having an aspect ratio (major axis of particles/minor axis of particles) of particles of from 1 to 1.5. The aspect ratio of the particles can be measured using an electron microscope photograph.

The porous film in the laminate film has fine pores. The porous film is preferably provided with a shutdown function, and in this case, it contains a thermoplastic resin. The size (diameter) of each fine pore of the porous film is normally 3 μm or less, and preferably 1 μm or less. The rate of porosity of the porous film is normally from 30 to 80% by volume, and preferably from 40 to 70% by volume. In the case where a non-aqueous electrolyte secondary battery is used at a temperature exceeding a normally used temperature, the separator exerts a shutdown function for the porous film, that is, is allowed to clog the fine pores by softening the porous film.

As the resin forming the porous film in the laminate film, a resin that is not dissolved in an electrolytic solution is selected. Specific examples of the resin include polyolefin resins such as polyethylene and polypropylene, and a thermoplastic polyurethane resin, and two or more kinds of the thermoplastic resins may be mixed and used. From the viewpoint of being softened at a lower temperature to shutdown, the porous film preferably contains a polyethylene resin, and more preferably contains polyethylene. Specific examples of the polyethylene include a low-density polyethylene, a high-density polyethylene and a linear polyethylene, and an ultra-high molecular weight polyethylene having a molecular weight of 1,000,000 or more. From the viewpoint of further increasing the sticking-resistant strength of the porous film, the porous film preferably contains an ultra-high molecular weight polyethylene. In order to easily produce the porous film, the thermoplastic resin may be preferably allowed to contain a wax made from polyolefin having a low molecular weight (weight average molecular weight of 10,000 or less) in some cases.

The thickness of the porous film in the laminate film is normally from 3 to 30 μm, preferably from 3 to 25 μm, and more preferably from 3 to 19 μm. The thickness of the laminate film is normally 40 μm or less, preferably 30 μm or less, and more preferably 20 μm or less. Assuming that the thickness of the heat-resistant porous layer is A (μm), and that the thickness of the porous film is B (μm), the value of A/13 is preferably from 0.1 to 1.

The following description will discuss one example of the production of a laminate film.

First, a method of producing a porous film will be described. The method of producing a porous film is not particularly limited. Examples of the method of producing a porous film include a method, as described in JP7-29563A, in which a plasticizer is added to a thermoplastic resin to be molded into a film, the plasticizer is removed using an appropriate solvent; and a method, as described in JP7-304110A, in which a film made from a thermoplastic resin produced by a known method is used, and an amorphous portion of the film, which is weak in structure, is selectively stretched to form fine pores. In the case where the porous film is formed by a polyolefin resin including an ultra-high molecular weight polyethylene and a low molecular weight polyolefin having a weight-average molecular weight of 10,000 or less, from the viewpoint of production costs, for example, the film is preferably produced using the following methods. That is, a method including the steps of:

(1) obtaining a polyolefin resin composition by kneading 100 parts by weight of an ultra-high molecular weight polyethylene, 5 to 200 parts by weight of a low molecular weight polyolefin having a weight-average molecular weight of 10,000 or less, and 100 to 400 parts by weight of an inorganic filler;
(2) molding the polyolefin resin composition to form a sheet;
(3) removing the inorganic filler from the sheet obtained in the step (2); and
(4) stretching the sheet obtained in the step (3) to form a porous film, or a method including the steps of:
(1) obtaining a polyolefin resin composition by kneading 100 parts by weight of an ultra-high molecular weight polyethylene, 5 to 200 parts by weight of a low molecular weight polyolefin having a weight-average molecular weight of 10,000 or less, and 100 to 400 parts by weight of an inorganic filler;
(2) molding the polyolefin resin composition to form a sheet;

(3) stretching the sheet obtained in the step (2) to form a stretched sheet; and
(4) removing the inorganic filler from the stretched sheet obtained in the step (3) to form a porous film.

From the viewpoints of the strength and ion permeability of the porous film, the inorganic filler preferably has an average particle size (diameter) of 0.5 µm or less, more preferably 0.2 µm or less. In this case, as the average particle size of the inorganic filler, a value obtained from measurements of an electron microscopic photograph is used. More specifically, from inorganic filler particles in a photographed image, arbitrary 50 particles are extracted and the respective particle sizes are measured so that an average value thereof is used.

Examples of the inorganic filler include calcium carbonate, magnesium carbonate, barium carbonate, zinc oxide, calcium oxide, aluminum hydroxide, magnesium hydroxide, calcium hydroxide, calcium sulfate, silicic acid, zinc oxide, calcium chloride, sodium chloride and magnesium sulfate. These inorganic fillers can be removed from the sheet or the film by bringing the fillers into contact with an acid or alkali solution to be dissolved therein. From the viewpoints of the controllability of the particle size and the selective dissolving property to acid, calcium carbonate is preferably used.

A method of producing the polyolefin resin composition is not particularly limited. The materials for forming the polyolefin resin composition, such as a polyolefin resin and an inorganic filler, are mixed with one another using a mixing apparatus such as rollers, a Banbury mixer, a single-screw extruder and a twin-screw extruder so that a polyolefin resin composition is obtained. Upon mixing the constituent materials, if necessary, additives such as a fatty acid ester, a stabilizer, an antioxidant, an ultraviolet-ray absorber, and a flame retardant may be added to the constituent materials.

A method of producing a sheet composed of the polyolefin resin composition is not particularly limited. Examples of the method include sheet-molding methods such as inflation processing, calender processing, T-die extrusion processing, and a skife method. Since a sheet with high film-thickness precision can be obtained, the following method is preferably used.

The preferable method of producing a sheet composed of the polyolefin resin composition is a method in which a pair of rotary molding tools are used for rolling and molding the polyolefin resin composition, and the surface temperature of the tools is adjusted to a temperature higher than the highest melting point of the polyolefin resins forming the polyolefin resin composition. The surface temperature of the rotary molding tools is preferably the melting point+5° C. or more. The upper limit of the surface temperature is preferably the melting point+30° C. or less, and more preferably the melting point+20° C. or less. Examples of the pair of rotary molding tools include rollers and belts. The peripheral rates of the rotations of the pair of rotary molding tools are not necessarily required to be precisely the same, and may be set so as to keep a difference of the rates within ±5%. A porous film produced by using the sheet obtained in accordance with this method is superior in strength, ion permeability and gas permeability. The porous film may be produced by stacking a plurality of sheets obtained in accordance with the method as described above.

In the case where the polyolefin resin composition is rolled and molded using the pair of rotary molding tools, a strand-shaped polyolefin resin composition extruded from the extruder may be directly introduced into the pair of rotary molding tools, or the polyolefin resin that has been once formed into pellets may be directly introduced thereinto.

The above-mentioned stretching may be carried out using a tenter, rollers, an autograph or the like. From the viewpoint of the gas permeability of the porous film, the stretching magnification is preferably from 2 to 12 times, more preferably from 4 to 10 times. The stretching temperature is normally a temperature where the softening point or more and melting point or less of the polyolefin resin composition, and preferably from 80 to 115° C. When the stretching temperature is too low, the film may tend to be easily ruptured at the time of stretching, and when it is too high, the gas permeability and ion permeability of the resultant porous film may tend to be lowered. After the stretching, a heat-setting process is preferably carried out. The heat setting temperature is preferably a temperature less than the melting point of the polyolefin.

In the present invention, the porous film obtained by the above-mentioned method and the heat-resistant porous layer are laminated to each other to obtain a laminate film. The heat-resistant porous layer may be formed on one surface of the porous film, or may be formed on both surfaces thereof.

Examples of a method of laminating the porous film and the heat-resistant porous film to each other include a method in which the heat-resistant porous layer and the porous film are separately produced, and then laminated to each other, and a method in which at least one surface of the porous film is coated with a coating fluid containing, for example, a heat-resistant resin and a filler so that a heat-resistant porous layer is formed. In the case where the heat-resistant porous layer is comparatively thin, the latter method is preferably used from the viewpoint of productivity. Specific examples of the method in which at least one surface of the porous film is coated with a coating fluid containing a heat-resistant resin and a filler so that a heat-resistant porous layer is formed include methods including the following steps:

(a) to a polar organic solvent solution containing 100 parts by weight of a heat-resistant resin, 1 to 1500 parts by weight of a filler is dispersed relative to 100 parts by weight of the heat-resistant resin so that a slurry-state coating fluid is prepared.
(b) at least one surface of a porous film is coated with the coating fluid so that a coating film is formed thereon.
(c) the heat-resistant resin is deposited from the coating film by a moistening procedure, a solvent-removing procedure, an immersing procedure of the heat-resistant resin into a solvent that does not dissolve the heat-resistant resin or the like, and the deposition product is dried if necessary, to form a heat-resistant porous layer.

The coating fluid is preferably continuously applied using the coating apparatus described in JP2001-316006A and the method described in JP2001-23602A.

In the case where the heat-resistant resin is para-aramide, examples of a polar organic solvent in the polar organic solvent solution include a polar amide-based solvent and a polar urea-based solvent, and specific examples thereof include, but are not limited to, N,N-dimethylformamide, N,N-dimethylacetoamide, N-methyl-2-pyrolidone (NMP), and tetramethyl urea.

In the case where para-aramide is used as the heat-resistant resin, in order to improve the solubility of the para-aramide to the solvent, an alkali metal or a chloride of an alkali-earth metal is preferably added at the time of polymerizing the para-aramide. Specific examples of chlorides include, but are not limited to, lithium chloride and calcium chloride. The amount of the chloride added to the polymerization system is preferably in a range from 0.5 to 6.0 mol and more preferably in a range from 1.0 to 4.0 mol relative to 1.0 mol of an amide group produced by the condensation polymerization. In the case where the amount of the chloride is less than 0.5 mol, the solubility of para-aramide to be generated may tend to be insufficient, while in the case where the amount of the chloride exceeds 6.0 mol, since the solubility of the chloride to the solvent is actually exceeded, this state may not be preferable. In general, when a chloride of an alkali metal or alkali-earth metal is less than 2% by weight, the solubility of para-aramide may tend to be insufficient; in contract, when it exceeds 10% by weight, the chloride of an alkali metal or alkali-earth metal may fail to dissolve in the polar organic solvent such as a polar amide-based solvent or a polar urea-based solvent.

In the case where the heat-resistant resin is an aromatic polyimide, as the polar organic solvent for dissolving the aromatic polyimide, one exemplified as a solvent for dissolving aramide, dimethyl sulfoxide, cresol, o-chlorophenol or the like can be preferably used.

An apparatus such as a pressure-type dispersing machine (Gaulin homogenizer, namomizer) may be used for a method of obtaining a slurry-state coating fluid with a filler dispersed therein.

Examples of a method of coating the slurry-state coating fluid include coating methods such as knife, blade, bar, gravure, and die coating methods, and the coating methods such as bar and knife coating methods are convenient; however, from an industrial point of view, the die coating method having a configuration in which the coating fluid is not brought into contact with external air is preferably used. The coating may be carried out two or more times in some cases. In this case, the coating is normally carried out after the heat-resistant resin has been deposited in the above-mentioned step (c).

In the case where the heat-resistant porous resin and the porous film are separately produced and then stacked each other, a method using an adhesive, a method using thermal fusion, and the like are proposed.

<Electrolytic Solution or Solid-State Electrolyte of Non-Aqueous Electrolyte Secondary Battery>

An electrolytic solution normally contains an electrolyte and an organic solvent. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, LiBOB (in this case, BOB represents bis(oxalato)borate), lithium salt of lower aliphatic carboxylic acid, and $LiAlCl_4$, and two or more kinds of the electrolytes may be mixed and used. Among these, one or more kinds of fluorine-containing lithium salts selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ are preferably used.

Examples of the organic solvent in the electrolytic solution include carbonates such as propylene carbonate, ethylene carbonate (hereinafter, sometimes referred to as EC), dimethyl carbonate (hereinafter, sometimes referred to as DMC), diethyl carbonate, ethylmethyl carbonate (hereinafter, sometimes referred to as EMC), 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methylether, 2,2,3,3-tetrafluoropropyl difluoromethylether, tetrahydrofuran and 2-methyl tetrahydrofuran; esters such as methyl formate, methyl acetate and γ-butyrolactone; nitriles such as acetonitrile and butyronitrile; amides such as N,N-dimethylformamide and N,N-dimethylacetoamide; carbamates such as 3-methyl-2-oxazolidone; sulfur-containing compounds such as sulforan, dimethylsulfoxide and 1,3-propane sultone; and those solvents formed by further introducing a fluorine substituent to the above-mentioned organic solvents. Preferably, a mixed solvent obtained by mixing two or more kinds of organic solvents among these solvents is used as the organic solvent. A mixed solvent containing carbonates is more preferably used, and a mixed solvent of a cyclic carbonate and an acyclic carbonate, or a mixed solvent containing a cyclic carbonate and ethers is furthermore preferably used as the organic solvent. As the mixed solvent of a cyclic carbonate and an acyclic carbonate, a mixed solvent containing EC, DMC and EMC is preferable from the viewpoints of providing a wide operating temperature range, a superior load characteristic and a hardly-decomposing property even in the case of using a graphite material such as natural graphite or artificial graphite as a negative electrode active material. In particular, from the viewpoint of obtaining a superior safety improving effect, an electrolytic solution containing an organic solvent having a fluorine-containing lithium salt such as $LiPF_6$, and a fluorine substituent is preferably used. A mixed solvent containing ethers having a fluorine substituent such as pentafluoropropyl methyl ether and 2,2,3,3-tetrafluoropropyl difluoromethyl ether and DMC is superior in a large-current discharging characteristic, and it is more preferably used.

In place of the electrolytic solution, a solid-state electrolyte may be used. As the solid-state electrolyte, for example, an organic polymer electrolyte such as a polyethylene oxide-based polymer or a polymer containing at least one kind of a polyorgano siloxane chain and a polyoxyalkylene chain may be used. A so-called gel-type electrolyte formed by allowing a polymer to support an electrolytic solution may also be used. An inorganic solid-state electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ or $Li_2S$—$SiS_2$—$Li_2SO_4$ may be used. By using these solid-state electrolytes, higher safety may be further ensured in some cases. In the nonaqueous electrolyte secondary battery, in the case of using a solid-state electrolyte, the solid-state electrolyte may serve as a separator in some cases, and in this case, no separator may be required in some cases.

EXAMPLES

The following description will further discuss the present invention in detail by means of examples. The evaluation method of a powder of a lithium mixed metal oxide, as well as the manufacture methods of an electrode and a non-aqueous electrolyte secondary battery, and the evaluation method of the secondary battery are described as follows.

(1) Manufacture of Electrode

A material, obtained by mixing acetylene black and graphite at a ratio of 9:1 (weight ratio), was used as a conductive material. A solution, obtained by dissolving PVdF (PolyVinylideneDiFluoride, manufactured by Kureha Corporation) in NMP (manufactured by Tokyo Chemical Industry Co., Ltd.), was used as a binder solution. An electrode active material and the conductive material were mixed and then the binder solution was added thereto so as to have the composition of lithium mixed metal oxide:conductive agent:binder=87:10:3 (weight ratio), and these were kneaded so that an electrode mixture paste was obtained. The paste was applied to an Al foil having a thickness of 40 μm serving as a collector, and this was dried at 60° C. for 2 hours so that an electrode sheet was obtained. Next, the electrode sheet was rolled at a pressure of 0.5 MPa using a press roller, and this was punched out by a punching machine into a size of 14.5 mmφ, and then vacuum-dried at 150° C. for 8 hours so that electrodes were obtained.

(2) Manufacture of Non-Aqueous Electrolyte Secondary Battery

The electrode obtained in (1) was used as a positive electrode. As a separator, a polypropylene porous film (thickness: 20 μm) was used. As a solvent for an electrolytic solution, a mixed solvent of EC:DMC:EMC=30:35:35 (volume ratio) was used. As an electrolyte, $LiPF_6$ was used. The electrolyte was dissolved in the mixed solvent at a rate of 1 mole/liter so that an electrolytic solution 1 was prepared. Metal lithium was used as a negative electrode. The positive electrode was placed on a concave portion of the lower part of a coin cell (manufactured by Hohsen Corporation) with its aluminum foil surface facing down, and the separator was placed thereon, and then electrolytic solution 1 was injected thereto. Next, the negative electrode and a middle lid were combined with each other and these were placed on the upper side of the separator with the negative electrode facing down, and the upper part was put thereon as a lid with a gasket interpolated therebetween, and the lid was caulked by using a caulking machine, so that a non-aqueous electrolyte secondary battery (coin-shaped battery 82032) was manufactured. The assembling processes of the battery were carried out in a glove box in an argon atmosphere.

(3) Evaluation of Non-Aqueous Electrolyte Secondary Battery

A non-aqueous electrolyte secondary battery obtained by the secondary battery (2) was evaluated through a discharging rate test shown below, while being retained at 25° C. In the discharging rate test, the discharging capacity was measured with the discharging current at the time of discharging being varied, and the discharging capacity retaining rate was calculated.

<Discharging Rate Test>
Charging maximum voltage: 4.3 V
Charging time: 8 hours
Charging current: 0.2 $mA/cm^2$ At the time of discharging, the discharging minimum voltage is set to a constant value of 3.0 V, and the discharging was carried out with the discharging current in each of cycles being changed in the following manner. In this case, the higher the discharge capacity at 10 C (high current rate), the higher output is indicated.

Discharging at $1^{st}$ and $2^{nd}$ cycles (0.2 C): Discharging current 0.2 $mA/cm^2$ Discharging at $3^{rd}$ cycle (1 C): Discharging current 1.0 $mA/cm^2$ Discharging at $4^{th}$ cycle (5 C): Discharging current 5.0 $mA/cm^2$ Discharging at $5^{th}$ cycle (10 C): Discharging current 10 $mA/cm^2$ <Discharging Capacity Retaining Rate>
Discharging capacity retaining rate (%)=(discharging capacity at $5^{th}$ cycle (10 C))/(initial discharging capacity (discharging capacity at $1^{st}$ cycle (0.2 C))×100

Upon evaluation of the energy density of the non-aqueous electrolyte secondary battery, the value of the discharging capacity of the discharge (0.2 C) at the $2^{nd}$ cycle was used.

(4) Evaluation of Powder of Lithium Mixed Metal Oxide
1. Measurements of BET Specific Surface Area After drying 1 g of a powder in a nitrogen atmosphere at 150° C. for 15 minutes, the BET specific surface area of the powder was measured using a Flowsorb II2300 manufactured by Micrometrics Instruments Corporation.

2. SEM Observation

On a conductive sheet pasted onto a sample stage, a powder was mounted, and by using a JSM-5510 manufactured by JEOL Ltd., an electron beam with an accelerating voltage of 20 kV was applied to the powder so that an SEM observation was carried out to find the diameter of primary particles forming the powder and the average diameter of the aggregated particle.

3. Composition Analysis

After dissolving a powder in a hydrochloric acid, the composition of the powder was determined using an inductively coupled plasma atomic emission spectrophotometry (SPS3000, hereinafter, may be sometimes referred to as ICP-AES).

4. Powder X-Ray Diffraction Measurements

Powder X-ray diffraction measurements were carried out on a powder of a lithium mixed metal oxide using RINT 2500 TTR manufactured by Rigaku Corporation. The measurements were carried out within a diffraction angle 2θ of from 10 to 90° by filling the powder of a lithium mixed metal oxide in an exclusively-used substrate and using a CuKα ray source so that an X-ray diffraction pattern was obtained.

Production Example 1

Layered Rock-Salt Type Structure

To 200 ml of distilled water in a beaker made of polypropylene was added 83.88 g of potassium hydroxide, and the potassium hydroxide was dissolved by stirring so that an aqueous potassium hydroxide solution (aqueous alkali solution) was prepared. To 200 ml of distilled water in a beaker made of glass were added a nickel chloride (II) hexahydrate (16.04 g), a manganese chloride (II) tetrahydrate (13.36 g) and an iron chloride (II) tetrahydrate (2.982 g), and these were dissolved by stirring so that an aqueous nickel-manganese-iron mixed solution was obtained. While stirring the aqueous potassium hydroxide solution, the aqueous nickel-manganese-iron mixed solution was added dropwise to this aqueous solution so that a coprecipitation slurry containing a generated coprecipitation product was obtained.

Next, the coprecipitation slurry was filtrated, and washed with distilled water, and the resultant solid component was dried at 100° C. so that the coprecipitation product was obtained. The coprecipitation product 2.0 g, a lithium hydroxide monohydrate (1.16 g) and KCl (1.16 g) were dry-mixed using an agate mortar to obtain a mixture. The mixture was put in a calcining container made of alumina, retained using an electric furnace at 800° C. in the atmosphere for 6 hours so as to be calcined, and cooled to room temperature, and then a calcined product was obtained. The calcined product was pulverized and the resultant pulverized product was washed with distilled water by using decantation, and filtrated to obtain a solid matter. The resultant solid matter was dried at 100° C. for 8 hours so that a powder $L_1$ was obtained.

The powder $L_1$ had a BET specific surface area of 7.8 $m^2/g$. In the SEM observation of the powder $L_1$, primary particles had a diameter of 0.2 μm, and aggregate particles that were formed by aggregation of primary particles had an average diameter of 0.5 μm. As a result of the composition analysis of the powder $L_1$, the powder $L_1$ had a molar ratio of Li:Ni:Mn:Fe of 1.10:0.45:0.45:0.10. As a result of the powder X-ray diffraction measurements of the powder $L_1$, the lithium mixed metal oxide of the powder $L_i$ had a layered rock-salt type crystal structure classified into the R-3m space group, and was found to be represented by the formula (1).

Production Example 2

Layered Rock-Salt Type Structure

A comparative powder $C_1$ was obtained in the same manner as in Production Example 1 except that the calcination of the mixture was carried out by retaining the calcination at 1000° C. in the atmosphere for 4 hours.

The powder $C_1$ had a BET specific surface area of 2.3 $m^2/g$. In the SEM observation of the powder $C_1$, primary particles had a diameter of 1.5 μm, and aggregate particles that were formed by aggregation of primary particles had an average diameter of 20 μm. As a result of the composition analysis of the powder $C_1$, the powder $C_1$ had a molar ratio of Li:Ni:Mn:Fe of 1.08:0.45:0.45:0.10. As a result of the powder X-ray diffraction measurements of the powder $C_1$, the lithium mixed metal oxide of the powder $C_1$ was found to be classified into the R-3m space group.

Production Example 3

Production of Spinel Type Crystal Structure (B)

LiOH was used as a lithium source, $Mn_2O_3$ was used as a manganese source, and AlOOH was used as an aluminum source. These were precisely weighed so as to have a molar ratio of Li:M:Al of 1:1.9:0.1, and these were wet-mixed by using a planetary-type ball mill and using ethanol as a solvent. The resultant mixture obtained by removing ethanol was put into a calcining container made of alumina, the temperature was raised up to 900° C. in a nitrogen atmosphere using an electric furnace, and after having reached 900° C., the mixture was retained in the atmosphere for 5 hours so as to be calcined, and cooled to room temperature, and then a calcined product was obtained. By pulverizing the calcined product, a powder $S_1$ was obtained.

The powder $S_1$ had a BET specific surface area of 0.9 m²/g. As a result of the composition analysis of the powder $S_1$, the powder $S_1$ had a molar ratio of Mn:Al of 1.9:0.1. As a result of the powder X-ray diffraction measurements of the powder $S_1$, the lithium mixed metal oxide of the powder $S_1$ had a spinel type crystal structure, and was found to be represented by the formula (2).

Comparative Example 1

The comparative powder $C_1$ (2 g) and the powder $S_1$ (2 g) were respectively precisely weighed (100 parts by weight of $C_1$ relative to 100 parts by weight of $S_1$), and sufficiently mixed in an agate mortar so that an electrode active material $CS_1$ was obtained. By using the electrode active material $CS_1$, a non-aqueous electrolyte secondary battery was manufactured as described above, and the discharging rate test was carried out on the secondary battery so that the discharging capacity retaining rate was found to be 66%.

Example 1

The powder $L_1$ (2 g) and the powder $S_1$ (2 g) were respectively precisely weighed (100 parts by weight of $L_1$ relative to 100 parts by weight of $S_1$), and sufficiently mixed in an agate mortar so that an electrode active material $LS_1$ was obtained. By using the electrode active material $LS_1$, a non-aqueous electrolyte secondary battery was manufactured as described above, and the discharging rate test was carried out on the secondary battery so that the discharging capacity retaining rate was found to be 81%, and it was found that the secondary battery is a battery with superior rate characteristics. Moreover, the energy density of the secondary battery in Example 1 was found to be greater than that of Comparative Example 1.

Production Example 4

Production Example of Laminate Film (1) Production of Coating Fluid

After 272.7 g of calcium chloride had been dissolved in 4200 g of NMP, to this was added 132.9 g of paraphenylene diamine and completely dissolved therein. To the resultant solution was gradually added 243.3 g of terephthaloyl dichloride to be polymerized so that para-aramide was obtained, and this was further diluted with NMP so that a para-aramide solution (A) having a concentration of 2.0% by weight was obtained. To the resultant para-aramide solution (100 g) were added 2 g of an alumina powder (a)(alumina C, manufactured by Japan Aerosil Inc., average particle size: 0.02 μm, with virtually spherical particles and an aspect ratio of 1) and 2 g of an alumina powder (b) (Sumicorundum AA03, manufactured by Sumitomo Chemical Co., Ltd., average particle size: 0.3 μm, with virtually spherical particles and an aspect ratio of 1), that is, the total of 4 g, and mixed therein as fillers, and this was treated by a nanomizer three times, and further filtered by a wire gauze with 1000 meshes, and then defoamed under reduced pressure so that a slurry-state coating fluid (B) was produced. The weight of the alumina powder (filler) relative to the total weight of the paraamide and the alumina powder was 67% by weight.

(2) Production of Laminate Film

As a porous film, a polyethylene porous film (film thickness: 12 μm, gas permeability: 140 seconds/100 ccs, average pore diameter: 0.1 μm, rate of porosity: 50%) was used. The polyethylene porous film was secured onto a PET film having a thickness of 100 μm, and the slurry-state coating fluid (B) was applied onto the porous film using a bar coater manufactured by Tester Sangyo Co., Ltd. The PET film and the coated porous film were immersed into water as a poor solvent while being integrally kept so that a para-aramide porous film (heat-resistant porous layer) was deposited thereon, and the solvent was then dried so that a laminate film 1 in which the heat-resistant porous layer and the porous film are stacked each other was obtained. The laminate film 1 had a thickness of 16 μm, and the para-aramide porous film (heat-resistant porous layer) had a thickness of 4 μm. The laminate film 1 had a gas permeability of 180 seconds/100 ccs, and a rate of porosity of 50%. When the cross section of the heat-resistant porous layer in the laminate film 1 was observed by a scanning electron microscope (SEM), it was found that comparatively small fine pores in a range from about 0.03 μm to 0.06 μm and comparatively large fine pores in a range from about 0.1 μm to 1 μm were present. Para-aramide as a nitrogen-containing aromatic polymer is used in the heat-resistant porous layer of the laminate film 1, and the thermal film-rupturing temperature of the laminate film 1 is about 400° C. The evaluations on the laminate film were carried out by the following methods.

(3)(Evaluation of Laminate Film)

(A) Thickness Measurements

The thickness of the laminate film and the thickness of the porous film were measured in accordance with JIS Standard (K7130-1992). Moreover, a value obtained by subtracting the thickness of the porous film from the thickness of the laminate film was used as the thickness of the heat resistant porous layer.

(B) Measurements of Gas Permeability by Gurley Method

The gas permeability of the laminate film was measured in accordance with JIS P8117 using a digital timer-type Gurley type Densometer manufactured by Yasuda Seiki Seisakusho Ltd.

(C) Rate of Porosity

The sample of the resulting laminate film was cut out into a square having a length of 10 cm in each side, and the weight W(g) and the thickness D (cm) were measured. The weights of the respective layers in the sample (Wi(g); i is an integer from 1 to n) were obtained, and based upon Wi and the true specific gravity (true specific gravity i (g/cm³)) of the material of each layer, the volume of each of the layers was obtained, and the rate of porosity (% by volume) was calculated from the following expression:

Rate of porosity(% by volume)=100×{1−(W1/True Specific Gravity 1+W2/True Specific Gravity 2+ ... +Wn/True Specific Gravity n)/(10×10×D)}

In each of the examples, by using the laminate film as a separator, a non-aqueous electrolyte secondary battery capable of further preventing the thermal film-rupturing can be obtained.

Industrial Applicability

The present invention makes it possible to provide a non-aqueous electrolyte secondary battery that can improve rate characteristics and energy density respectively with a good balance, and the present invention is effectively usable as a non-aqueous electrolyte secondary battery for automobiles and power tools for electric tools and the like.

The invention claimed is:

1. An electrode active material comprising the following powder (A) and powder (B):
    (A) a powder of a lithium mixed metal oxide that is represented by the following formula (1) and has a layered rock-salt type crystal structure, the powder having a BET specific surface area of from 3 m²/g to 30 m²/g, $$Li(Ni_{1-(x+y)}Mn_xFe_y)O_2 \quad (1)$$

wherein x is within a range of more than 0 to less than 1, y is within a range of more than 0 to not more than 0.1, and x+y is within a range of more than 0 to less than 1;
    (B) a powder of a lithium mixed metal oxide that has a spinel type crystal structure and a BET specific area of from 0.1 m²/g to 4 m²/g.

2. The electrode active material according to claim 1, wherein the content of the powder (A) is from 10 parts by weight to 900 parts by weight relative to 100 parts by weight of the powder (B).

3. The electrode active material according to claim 1, wherein
    the powder (A) is composed of primary particles having a diameter of from 0.01 μm to 0.5 μm and
    aggregated particles that are formed by aggregation of primary particles having a diameter of from 0.01 μm to 0.5 μm and have an average diameter of from 0.05 μm to 2 μm.

4. The electrode active material according to claim 1, wherein x is from 0.3 to 0.6.

5. The electrode active material according to claim 1, wherein y is from 0.02 to 0.1.

6. The electrode active material according to claim 1, wherein the lithium mixed metal oxide in the powder (B) contains Mn.

7. The electrode active material according to claim 1, wherein the lithium mixed metal oxide in the powder (B) is represented by the following formula (2):

$$Li(Mn_aM_{1-a})_2O_4 \quad (2)$$

wherein M represents one or more elements selected from the group consisting of Al, Mg and transition metal elements, and a is within a range of more than 0 to not more than 1.

8. An electrode comprising the electrode active material according to claim 1.

9. A non-aqueous electrolyte secondary battery comprising the electrode according to claim 8 as a positive electrode.

10. The non-aqueous electrolyte secondary battery according to claim 9 further comprising a separator.

11. The non-aqueous electrolyte secondary battery according to claim 10, wherein the separator is a laminate film which has a heat-resistant porous layer and a porous film laminated to each other.

* * * * *